United States Patent [19]

Müller et al.

[11] Patent Number: 4,756,834

[45] Date of Patent: Jul. 12, 1988

[54] PHASE SUPPORTS FOR THE PARTITION CHROMATOGRAPHY OF MACROMOLECULES, A PROCESS FOR THEIR PREPARATION AND THEIR USE

[75] Inventors: Werner Müller, Munich; Heinz Ludwig Sänger, Martinsried, both of Fed. Rep. of Germany

[73] Assignee: Merck Patent Gesellschaft mit beschrankter Haftung, Darmstadt, Fed. Rep. of Germany

[21] Appl. No.: 75,500

[22] Filed: Jul. 20, 1987 (Under 37 CFR 1.47)

Related U.S. Application Data

[62] Division of Ser. No. 794,921, filed as PCT EP85/00054 on Feb. 20, 1985, published as WO85/03885, on Sep. 12, 1985, abandoned.

[30] Foreign Application Priority Data

Mar. 2, 1984 [DE] Fed. Rep. of Germany ....... 3407814

[51] Int. Cl.$^4$ .............................................. B01D 15/08
[52] U.S. Cl. .................... 210/635; 210/656; 435/182; 435/803; 530/413
[58] Field of Search ............... 210/635, 656, 657, 658, 210/659, 198.2, 502.1; 502/402; 435/180, 182, 803; 530/413, 417

[56] References Cited

U.S. PATENT DOCUMENTS

| | | | |
|---|---|---|---|
| 3,954,678 | 5/1976 | Marquisee | 502/402 |
| 3,983,053 | 9/1976 | Courtney | 502/404 |
| 4,045,353 | 8/1977 | Kosaka | 502/402 |
| 4,076,619 | 2/1978 | Howery | 502/402 |
| 4,076,892 | 2/1978 | Fennimore | 502/402 |
| 4,111,838 | 9/1978 | Schaefer | 210/635 |
| 4,140,653 | 2/1979 | Imura | 502/402 |
| 4,159,966 | 7/1979 | Roberts | 502/402 |
| 4,171,283 | 10/1979 | Nakashima | 502/402 |
| 4,245,005 | 1/1981 | Regnier | 502/402 |
| 4,330,440 | 5/1982 | Ayers | 210/635 |
| 4,443,339 | 4/1984 | Rosevear | 210/635 |
| 4,512,898 | 4/1985 | Oi | 502/402 |

FOREIGN PATENT DOCUMENTS 0129905  1/1985  European Pat. Off. ............ 502/402

OTHER PUBLICATIONS

Snyder, Introduction to Liquid Chromatography, John Wiley & Sons, Inc., New York, 1979, pp. 272-278 and 532-533.

Primary Examiner—Ernest G. Therkorn
Attorney, Agent, or Firm—Millen & White

[57] ABSTRACT

Phase supports are disclosured for the partition chromatography of macromolecules. The phase supports are composed of non-adsorptive base support particles which are insoluble in the phase system and which have an average particle size within the range from 7 to 2000 μm. The surface of the support particles is coated with a material which is insoluble in the phase system, adheres firmly to the particles and has an affinity for one of the phases of the phase system for the partition chromatography. Also disclosed is a process for the preparation of the phase supports and their use for separating, by partition chromatography, macromolecules, biopolymers, subcellular units and whole cells, particularly in an aqueous polyethylene glycol/dextran two-phase system.

12 Claims, 3 Drawing Sheets und 4,756,834

PHASE SUPPORTS FOR THE PARTITION CHROMATOGRAPHY OF MACROMOLECULES, A PROCESS FOR THEIR PREPARATION AND THEIR USE

This is a division of application Ser. No. 794,921 filed filed as EP85/00054 on Feb. 20, 1985, published as WO85/03885 on Sep. 12, 1985, now abandoned.

BACKGROUND OF THE INVENTION

The invention relates to phase supports for the partition chromatography of macromolecules, in particular in an aqueous polyethylene glycol/dextran two-phase system, to a process for their preparation and to their use.

It is known that biological macromolecules, subcellular units, bacteria and eucaryotic cells can be separated by counter-current partition in an aqueous polyethylene glycol/dextran system (P. Å. Alberston "Partition of Cell Particles and Macromolecules" (1971), 2nd edition, Almquist and Wiksell, Stockholm). These counter-current partition processes are, however, extremely involved in terms of apparatus and are time-consuming, especially if, in the case of small partition coefficients, a large number of counter-current partition stages is necessary in order to achieve the desired separation. Attempts have therefore already been made to replace this counter-current partition process by a partition chromatography process, since it is possible to achieve a large number of separation stages considerably more easily in this manner. However, these attempts have hitherto failed owing to a lack of suitable supports for the stationary phase.

Hitherto it has only been possible to separate by chromatography double-stranded nucleic acids in an aqueous polyethylene glycol/dextran system using cellulose as the support for the dextran-rich stationary phase (W. Müller, H. J. Schuetz, C. Guerrier-Takada, P. E. Cole and R. Potts, Nucleic Acids Research, Volume 7, No. 8 (1979), 2483 to 2499, and W. Müller and G. Kütemeier, Eur. J. Biochem. 128 (1982), 231 to 238). In these investigations of the liquid/iquid chromatography of DNA fragments, the support materials employed for the dextran-rich phase of the aqueous polyethylene glycol/dextran system were a number of materials of which cellulose, in particular, has proved suitable, since it exhibits an adequate affinity for the dextran-rich phase. However, these phase supports cannot be used for proteins and protein-containing cell constituents because of their pronounced adsorption properties; troublesome effects caused by adsorption also manifest themselves in the case of ribonucleic acids. Although cationic or anionic gels based on polysaccharides bind the dextran-rich phase as well as cellulose does, they can only be used for isocratic separation processes, since the phase is repelled as soon as the electric phase potential changes in the course of the gradient elution with various salts in the mobile, polyethylene-rich phase.

Amongst the neutral gels which would be suitable for use as potential phase supports for partition chromatography of this type are porous copolymers based on vinyl compounds (Fractogels made by Merck, Darmstadt) and the polyacrylamide gels (Biogels made by Biorad). The former bind too small an amount of the dextran phases for general use, whereas in the latter case the bound phase is hardly accessible to macromolecules. This state of affairs is also clearly emphasised in the literature reference quoted above, Eur. J. Biochem. 128 (1982), page 233. This inaccessibility of the bound phase also applies to polyacrylamide/agarose combination gels (for example the AcA-Ultrogels made by IDF).

SUMMARY OF THE INVENTION

The object of the present invention therefore consists in providing phase supports which have a universal field of use in the partition chromatography of macromolecules, and which make possible an excellent separation in a simple manner, are simple to prepare and are just as suitable for the separation of low-molecular and high-molecular ribonucleic acids as for subcellular units and whole cells, which is of great importance, in particular for virus research and viroid research.

It has now been found that these objects can be achieved by means of phase supports comprising base support particles the surface of which is coated with a firmly adhering material having an affinity for one of the phases in the phase system for the partition chromatography.

DESCRIPTION OF THE PREFERRED EMBODIMENTS

Figure 2:
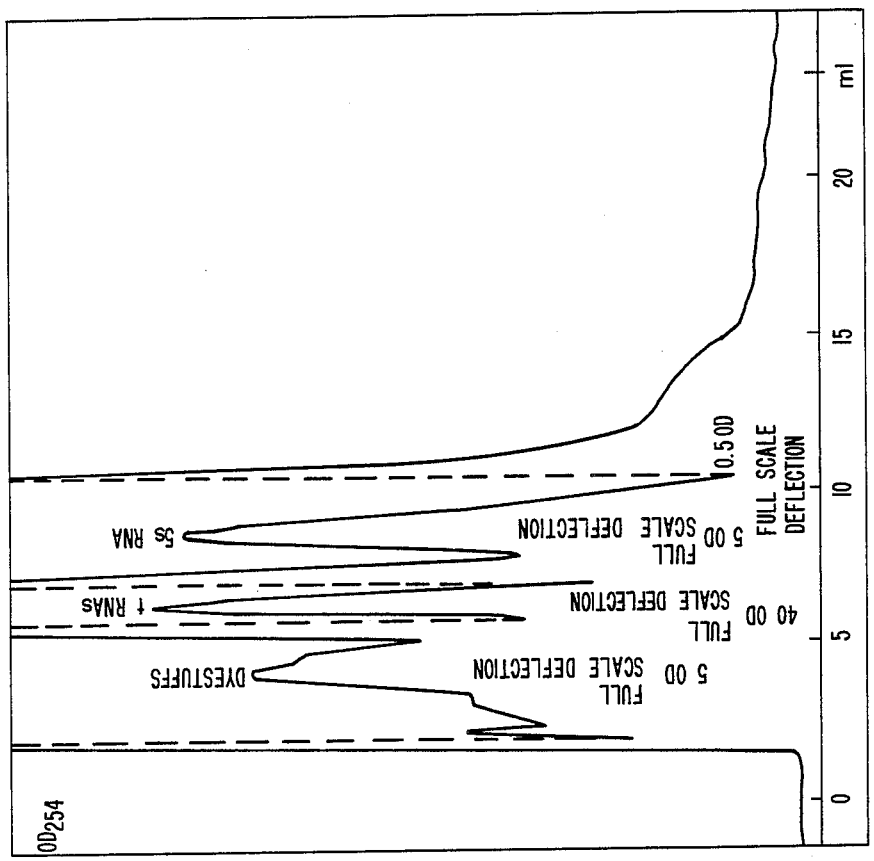
FIG. 1, FIG. 2, FIG. 3, FIG. 4, FIG. 5, and FIG. 6 each shows comparisons tests of chromatographic particles.

The invention relates, therefore, to phase supports for the partition chromatography of macromolecules, especially single-stranded nucleic acids and particularly proteins and also subcellular units and whole cells, which phase supports consist of nonadsorptive base support particles which are insoluble in the phase system and have an average particle size within the range of 7 to 2000 $\mu$m, the surface of which is coated with a material which is insoluble in the phase system, adheres firmly and has an affinity for one of the phases in the phase system for the partition chromatography.

In the case of the phase support according to the invention, the base support particles are coated with a firmly adhering material having an affinity for one of the phases, in particular the dextran phase of the polyethylene glycol/dextran two-phase system, which has the result that the dextran phase is necessarily bound to the surface in these combination particles and is thus accessible even for extremely large molecules up to the size of whole cells. On the other hand, the base support particles ensure the required mechanical stability of the phase support.

In accordance with a preferred embodiment of the invention, the base support particles consist of an inorganic and/or organic material, for example aluminium oxide, a silicate, kieselghur, silica gel, cellulose, cellulose derivatives, crosslinked dextran, crosslinked agarose or a polymer or copolymer based on monomers such as acrylic acid, acrylamide, acrylic acid ester, acrylonitrile, methacrylic acid, methacrylamide, methacrylic acid esters, methacrylonitrile and/or vinyl compounds or mixtures of these monomers. It is particularly preferable for the base support particles to consist of one of these indicated materials in a hydroxylated form, since it is possible to attach the surface layer firmly to the base support particles without difficulty in this way, in particular to achieve a chemical bond between the material of the surface layer and that of the base support particles.

It is particularly advantageous to employ base support particles composed of a diol-substituted silica gel, a hydrophilized polymethacrylate, a silicate having a starch-like coating or a porous polymer based on vinyl compounds.

It is particularly advantageous for the base support particles of the phase support according to the invention to have an average particle size from 7 to 100 μm, and in particular from 10 to 50 μm.

In accordance with a further preferred embodiment of the invention, the base support particles are coated with a polymeric material which, particularly advantageously, is chemically linked to the material of the base support particles. In this respect, it has proved particularly advantageous to coat the base support particles with a synthetic polymer or copolymer which is formed by grafting the monomeric constituents onto the base support particles. For this purpose, grafted polyacrylamide and, in particular, linear or slightly crosslinked polyacrylamide have proved to be the most suitable for the desired separation effect.

The invention also relates to a process for the preparation of this phase support, which consists in attaching the base support particles of the type described above chemically to the polymeric material applied in the form of a surface layer. This is preferably carried out by providing the base support particles with the surface layer of the polymeric material by means of graft polymerization.

In accordance with a preferred embodiment of this process, the base support particles composed of a hydroxylated material of the type indicated above are suspended in a solution containing the monomer(s), after which the grafting of the polymeric material is effected in the course of a redox polymerization with the exclusion of oxygen. Cerium(IV) ions can be used with advantage as the polymerization catalyst in this process, since this material effects the formation of the free radicals promoting the polymerization solely on the surface of the base support particles, so that the polymerization takes place in the form of a graft polymerization. In regard to details of this process, which is in itself known, reference should be made to G. Mino and S. Kaizerman in the Journal of Polymer Science, Volume XXXI, No. 122 (1958), 242 to 243.

In this mode of carrying out the process, the acrylamide used for the formation of the polyacrylamide which is preferred as the surface layer is preferably employed in the form of an aqueous solution.

It has been found that, in the redox polymerization in the presence of cerium(IV) ions quoted above, the graft polymerization of acrylamide with careful exclusion of oxygen produces, on the base support particles, in the course of 30 to 240 minutes, an adequately dense layer of polyacrylamide which is sufficient to bind an adequate amount of the dextran phase for the partition chromatography in the aqueous polyethylene glycol/dextran system.

Specifically, the following supports have successfully been provided with a layer of polyacrylamide:

"Superose ®": Crosslinked agarose made by Pharmacia, particle size 25 to 40 μm,

"Lichrosorb ®"-Diol: Diol-substituted silica gel made by Merck, particle size 10 μm, "Separon Hema 1000 ®": Hydrophilized polymethacrylate made by laboratory Instruments Works, Prague, particle size 16 to 21 μm, "TSK-SIL 3000 ®": Silicate support with a starch-like coating made by Toyo Soda, particle size 10 μm (inter alia contained in the "blue column" made by LKB), "TSK-HW-40(S) ®,-55(S), -65(S) and -75(S)": Porous copolymers based on vinyl compounds, 1 milliequivalent of OH/g, made by Toyo Soda, obtainable as "Fractogels" from Merck, particle size 25 to 40 μm.

It has been found that the phase supports according to the invention are suitable for the separation of low-molecular and high-molecular ribonucleic acids, double-stranded nucleic acids, subcellular units and whole cells, so that they can be used for the isolation of viroid-RNA from crude plant extracts and for the chromatographic separation of subcellular units and whole cells, inter alia for medicinal-diagnostic purposes.

The invention also relates, therefore, to the use of the phase support defined above for the separation by partition chromatography of macromolecules, biopolymers, subcellular units and whole cells in aqueous two-phase and multi-phase systems based on polymers, such as have been described, for example, by P. Å. Albertson ("Partition of Cell Particles and Macromolecules" (1971), 2nd edition, Almquist and Wiksell, Stockholm, pages 18–30), in particular in aqueous polyethylene glycol/dextran two-phase systems.

The following examples serve to illustrate the invention further.

EXAMPLE 1

This example illustrates the preparation of a phase support according to the invention.

A three-necked flask equipped with a gas inlet tube, a dropping funnel and a vacuum connection is charged with a solution of 50 g of acrylamide in 500 ml of distilled water, and 20 g of base support particles composed of a diol-substituted silica gel (Lichrosorb ®-Diol made by Merck) having a particle size of 10 μm are suspended in this solution. The flask is then flushed for 5 minutes with re-purified nitrogen and is evacuated and again filled with nitrogen. These measures of evacuating and filling with nitrogen are repeated twice, after which 15 ml of a 0.2M solution of cerium(IV) ammonium nitrate in 1N nitric acid is added with stirring. Nitrogen is passed through the suspension for 60 minutes, with moderate stirring, during which time the intensity of the yellow color of the cerium(IV) ions decreases markedly. A further 20 g of the base support particles are then added to the suspension, with the admission of air, and, after mixing, the suspension is filtered under pressure through a Blauband filter (Schleicher & Schüll No. 589[3]). After being washed with 400 ml of distilled water, the residue is washed with about 400 ml of a 0.2M solution of sodium acetate in a cacodylate buffer (10 mM of sodium cacodylate/1 mM of ethylenediaminetetraacetic acid, pH=6).

Base support particles composed of the materials quoted specifically above are provided similarly with a layer of polyacrylamide, it being necessary to carry out the dilution indicated above of the polyacrylamide-coated support with uncoated material. In the case of base support particles composed of "Lichrosorb ®", this dilution is necessary in order to render the coated material filterable and thus to promote coating with the dextran phase.

EXAMPLE 2

In order to illustrate the separation properties of the phase support according to the invention, comparative tests were carried out in which the phase supports according to the invention were contrasted with phase supports consisting only of the base support particles of the appropriate phase support according to the invention.

The phase supports were first coated with the dextran phase of the polyethylene glycol/dextran system as follows.

The washed material was rinsed in the pressure filter at 37° C. with 2.5 volumes of the dextran phase of the polyethylene glycol/dextran system (prepared by dissolving 66.3 g of dextran T500 and 5.4 g of polyethylene glycol 8000 in 428.3 ml of 0.2M sodium acetate in the cacodylate buffer described in Example 1), after which the phase excess was extracted by washing with the polyethylene glycol-rich upper phase of the same system (prepared by dissolving 3 g of dextran T500, 71.7 g of polyethylene glycol 8000 in 925.3 ml of 0.2M sodium acetate in the cacodylate buffer). After the material had been suspended in 3 volumes of upper phase, the phase support obtained in this manner was flushed into a suitable chromatography tube equipped with a heating jacket controlled thermostatically at 37° C.

The separation propereties of the uncoated base support particles equipped in this way with the dextran phase, on the one hand, and of the phase supports according to the invention, on the other hand, were then investigated using a sample material based on a mixture of transfer-RNA (tRNA) and 5 sRNA. The two RNA components belong to the category of soluble ribonucleic acids and have the following properties:

tRNA: Molecular weight≃30,000, consists of 40 to 60 species of equal size, differing in their amino acid acceptor activity.

5sRNA: Molecular weight≃43,000, a unitary RNA in most organisms, which plays a part in the translation of an RNA base sequence into an amino acid sequence.

The separation is carried out in the polyethylene glycol/dextran system "D" composed of 6.20% by weight of dextran, 4.40% by weight of polyethylene glycol and 89.40% by weight of water, which consists, in the lower phase, of 13.25% by weight of dextran, 1.07% by weight of polyethylene glycol and 85.68% by weight of water and, in the upper phase, of 0.30% by weight of dextran, 7.17% by weight of polyethylene glycol and 92.53% by weight of water (this and similar polyethylene glycol/dextran systems are known from the literature reference quoted above, P. Å. Albertson, see especially the phase diagram on page 264). In this polyethylene glycol/dextran two-phase system, the partition coefficient can be influenced especially by means of the ionic composition, that is to say by adding various salts, the lithium ions increasing the partition coefficient K, while the other alkali metal cations exert the opposite effect.

In the separation carried out here, the following electrolytes are therefore used in the phase pair:
10 mM sodium cacodylate buffer having a pH of 6.0,
3 mM sodium azide,
1 mM sodium ethylenediaminetetraacetate and
0.2M sodium acetate.

The separation is carried out in the chromatography column controlled thermostatically at a temperature of 37° C.

The amounts of the samples are indicated in $OD_{254}$ units, that is to say as the optical density at a wavelength of 254 nm, 25 $OD_{254}$ units corresponding to 1 mg of RNA.

Figure 1:
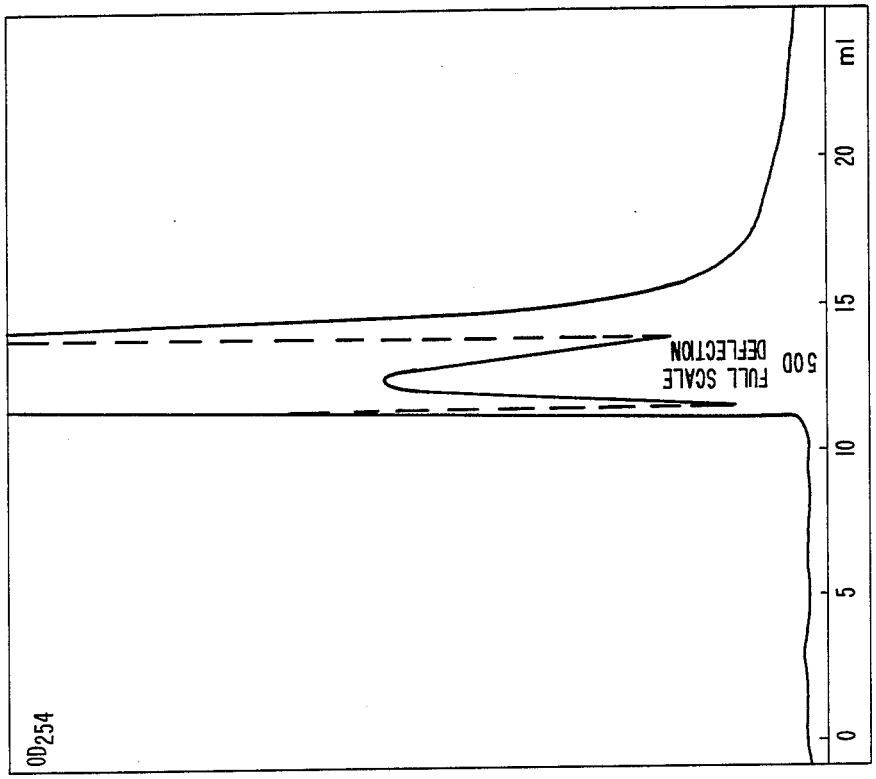
Figure 4:
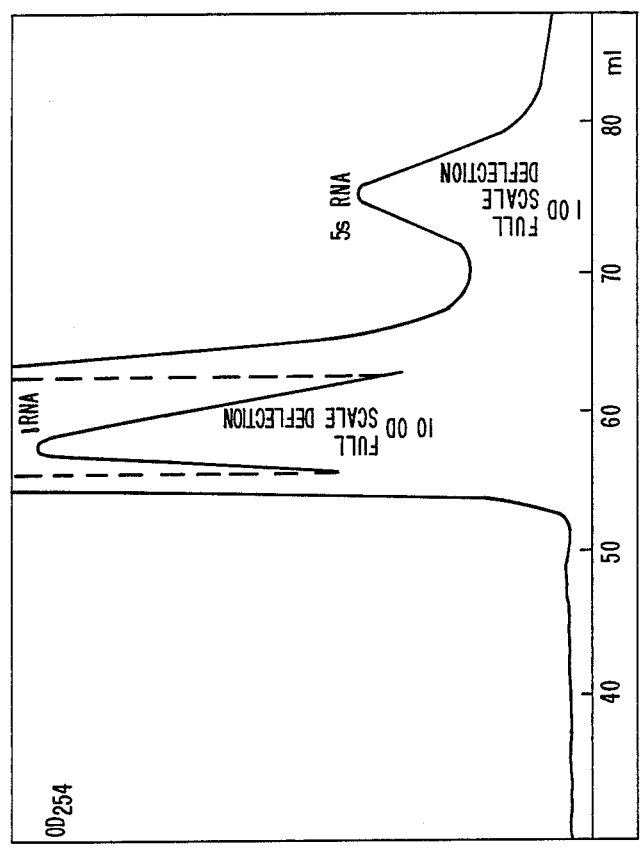
Figure 3:
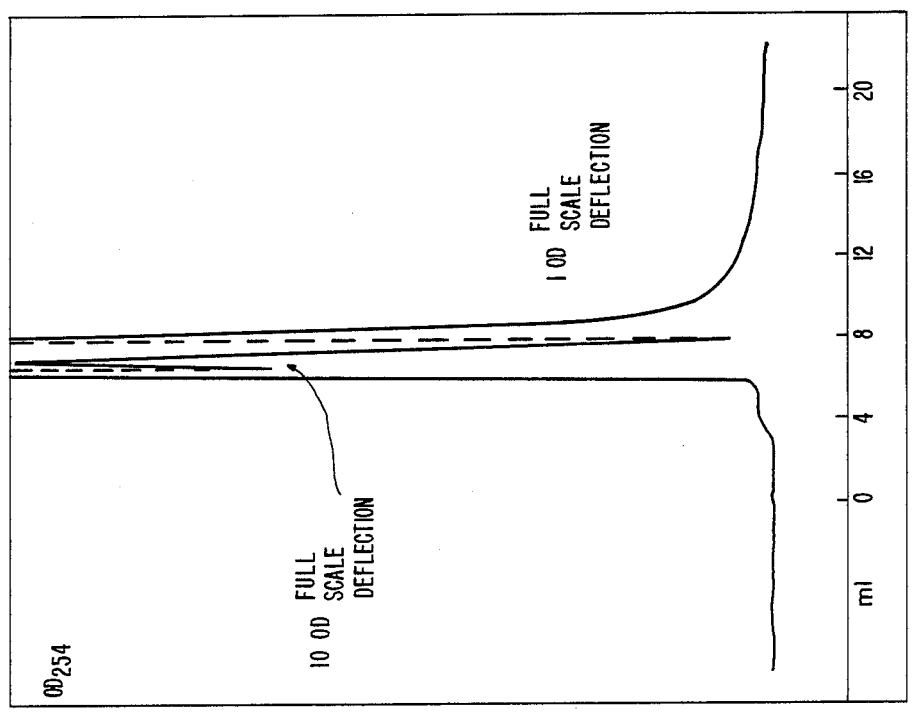
Figure 6:
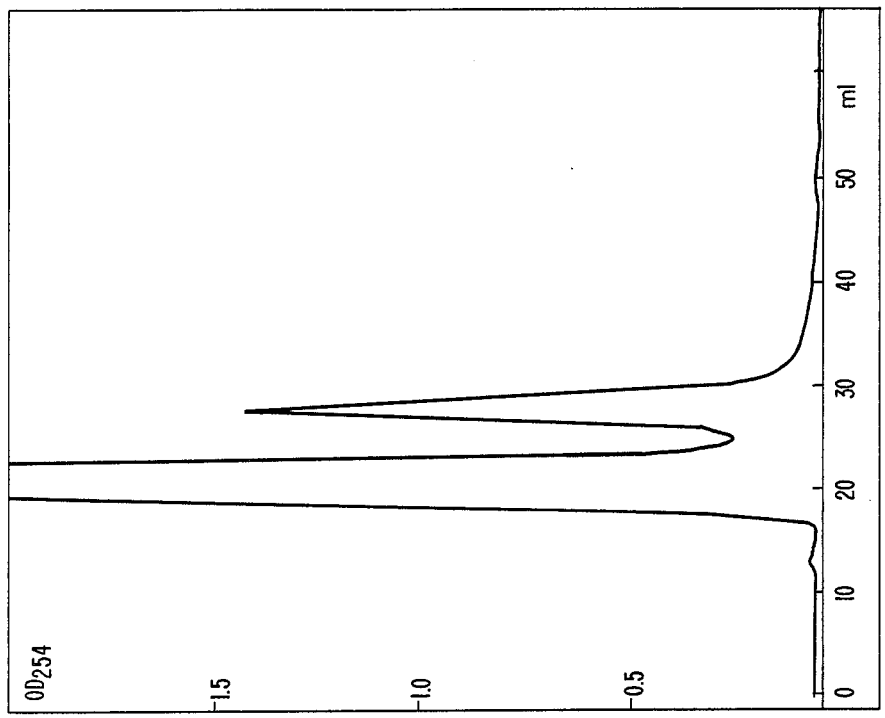
Figure 5:
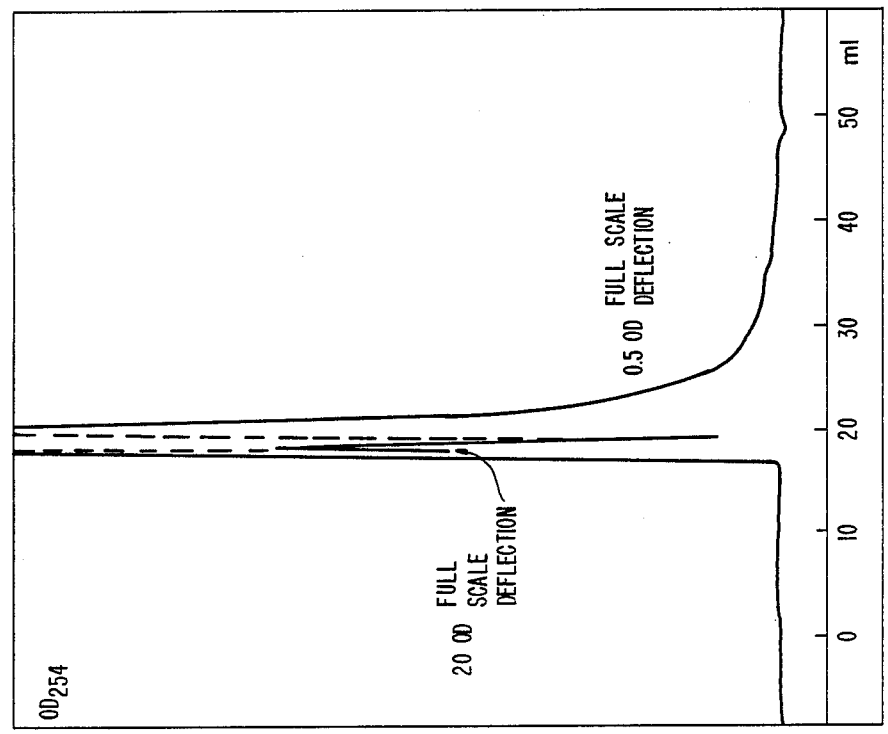

The results obtained in these separations are illustrated in FIGS. 1 to 6 attached, these Figures specifically showing the following:

FIG. 1: Comparison test: chromatography of a 10 $OD_{254}$ sample on a column filled with base support particles of "Lichrosorb ®"-diol which have not been coated with polyacrylamide. Column volume: 55 ml; flow rate: 18 ml/hour;

FIG. 2: Test according to the invention: separation of a 50 $OD_{254}$ sample containing dyestuff on a column charged with polyacrylamide-coated base support particles composed of "Lichrosorb ®"-diol. Column volume: 8.4 ml; flow rate: 15 ml/hour;

FIG. 3: Comparison test: chromatography of a 19 $OD_{254}$ sample on a column filled with base support particles composed of "Superose ®", column volume: 10 ml; flow rate: 9 ml/hour;

FIG. 4: Test according to the invention: separation of a 50 $OD_{254}$ sample on a column charged with polyacrylamide-coated "Superose ®" particles, column volume: 60 ml; flow rate: 20 ml/hour;

FIG. 5: Comparison test: chromatography of a 35 $OD_{254}$ sample on a column charged with base support particles composed of "TSK-HW-40(S)", column volume: 65 ml; flow rate: 15 ml/hour;

FIG. 6: Test according to the invention: separation of a 35 OD254 sample on a column charged with polyacrylamide-coated "TSK-HW-40(S)" base support particles, column volume: 65 ml; flow rate: 15 ml/hour.

It can be seen that the above figures that, in comparison with columns containing uncoated base support particles, a surprisingly clean separation of the constituents of the separation mixture employed is possible by means of the phase supports according to the invention. Therefore, it is thus evident that the phase supports according to the invention possess an unexpectedly advantageous suitability for the separation of biological macromolecules, which could in no way have been foreseen, and can be used with great advantage for separation processes and medicinal-diagnostic processes.

We claim:

1. In a process of liquid-liquid partition chromatography of macromolecules, biopolymers, subcellular units, and whole cells over a phase support, wherein a sample is partitioned between a liquid mobile phase and a liquid phase associated with the phase support, the improvement wherein said phase support comprises hydroxylated organic or inorganic base support particles having an average particle size of about 7—2000 μm, and a coating of polyacrylamide covalently bonded to the surface of said base support particles via the hydroxyl groups, said base support particles being non-absorptive and insoluble in the phase system used for partition chromatography.

2. A process according to claim 1, wherein the liquid-liquid system for chromatography is an aqueous polyethylene glycol/dextran two-phase system.

3. A process according to claim 2, wherein the separation is performed on single stranded nucleic acids.

4. A process according to claim 2, wherein, during separation, the dextran rich phase adheres to the polyacrylamide coating on the support particles and the polyethylene glycol phase is mobile.

5. A process according to claim 1, wherein said hydroxylated base support particles are hydroxylated aluminum oxide, silicate, kieselguhr, silica gel or cellulose, a hydroxylated cellulose derivative, or a hydroxylated crosslinked dextran, agarose or polymer or copolymer of acrylic acid, acrylic acid ester, acrylamide, methacrylamide, methacrylic acid, methacrylic acid ester or vinyl compound.

6. A process according to claim 1, wherein said support particles are formed of a diol-substituted silica gel, a hydrophilized polymethacrylate, a silicate with starch-like coating or a porous vinyl polymer.

7. A process according to claim 1, wherein said support particles have an average particle size of about 7–100 μm.

8. A process according to claim 1, wherein said support particles are coated with a grafted linear polyacrylamide.

9. A process according to claim 1, wherein said support particles are coated with a slightly crosslinked polyacrylamide.

10. A process according to claim 1, wherein said support particles with polyacrylamide coating are produced by suspending the support particles in a solution of acrylamide monomer and effecting a grafting polymerization to form the polyacrylamide coating by redox polymerization with exclusion of oxygen.

11. A process according to claim 10, wherein cerium (IV) ions are employed during the polymerization step as a catalyst.

12. A process according to claim 1, wherein said polyacrylamide coating has an affinity for the dextran rich phase of a polyethylene glycol/dextran two-phase system.

* * * * *